(12) United States Patent
Jones et al.

(10) Patent No.: US 11,396,336 B2
(45) Date of Patent: Jul. 26, 2022

(54) ANTI-TOENAILING TRACK SHOE

(71) Applicant: Caterpillar Inc., Deerfield, IL (US)

(72) Inventors: Benjamin Isaac Jones, Bartonville, IL (US); Benoit Abello, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 607 days.

(21) Appl. No.: 16/245,757

(22) Filed: Jan. 11, 2019

(65) Prior Publication Data
US 2020/0223501 A1 Jul. 16, 2020

(51) Int. Cl.
*B62D 55/20* (2006.01)
*B62D 55/21* (2006.01)

(52) U.S. Cl.
CPC ........... *B62D 55/202* (2013.01); *B62D 55/20* (2013.01); *B62D 55/21* (2013.01)

(58) Field of Classification Search
CPC ...... B62D 55/20; B62D 55/202; B62D 55/21; B62D 55/32
See application file for complete search history.

(56) References Cited

U.S. PATENT DOCUMENTS

| | | | |
|---|---|---|---|
| 3,955,855 A * | 5/1976 | Massieon | B62D 55/202 305/192 |
| 4,042,282 A * | 8/1977 | Haslett | B60S 1/68 305/194 |
| 5,759,309 A | 6/1998 | Watts et al. | |
| 6,929,335 B2 * | 8/2005 | Colwell | B62D 55/14 305/194 |
| 9,290,217 B2 | 3/2016 | Steiner et al. | |
| 9,440,693 B2 | 9/2016 | Liu et al. | |
| 9,688,325 B2 | 6/2017 | Hakes et al. | |
| 10,946,911 B2 * | 3/2021 | Hakes | B62D 55/202 |
| 2014/0346856 A1 | 11/2014 | Colwell | |
| 2017/0275717 A1 * | 9/2017 | Saad | C21D 7/04 |

FOREIGN PATENT DOCUMENTS

| | | |
|---|---|---|
| AU | 2014100032 B4 | 12/2014 |
| JP | 2009160974 A | 7/2009 |
| WO | 03004336 | 1/2003 |
| WO | 2007108486 A1 | 9/2007 |
| WO | 2016037231 | 3/2016 |
| WO | 2017010376 A1 | 1/2017 |

* cited by examiner

*Primary Examiner* — Kip T Kotter
*Assistant Examiner* — Emily G. Castonguay
(74) *Attorney, Agent, or Firm* — Brannon Sowers & Cracraft

(57) ABSTRACT

A machine track includes a track shoe having a first outboard edge and a second outboard edge, and a first set of pin lugs and a second set of pin lugs. A roller pad is positioned between the sets of pin lugs and includes a roller contact surface extending between a first roller pad end and a second roller pad end. The first roller pad end includes a relatively softer material, and the second roller pad end includes a relatively harder material that forms a trimming edge for trimming off interfering material of an adjacent track shoe in a machine track that is plastically deformed by way of roller contact with the adjacent track shoe during service.

20 Claims, 3 Drawing Sheets

ANTI-TOENAILING TRACK SHOE

TECHNICAL FIELD

The present disclosure relates generally to machine track, and more particularly to a track shoe having a track pad structured to trim plastically deformed material from an adjacent track shoe during service.

BACKGROUND

Ground-engaging tracks are used in a great many different machines operated in off-highway environments. A typical machine track includes a plurality of coupled-together track links attached to track shoes to form an endless loop that extends about rotatable track-engaging elements, such as one or more idlers and a drive sprocket. Track rollers supported by a roller frame support the weight of the machine upon the track as the machine is moved about a worksite.
A great deal of engineering effort has been directed at design of the various track system components to provide robust support for the machine, as well as traction in extremely harsh environments. Track-type machines are often quite heavy, and off-highway worksites can have substrates formed of hard and rocky materials, subjecting the equipment to demanding wear conditions, high mechanical loads, and corrosive conditions. Various abrasion and corrosion-resistant materials, lubrication strategies, and the shapes and proportions of track components themselves have been proposed over the decades. In the case of certain mining machines, servicing the tracks can require significant downtime during which the machine is of course not operational. When servicing the track is unexpected, such as in the case of a field failure, the economic consequences can be significant. Field service of tracks in certain mining machines can require other heavy equipment to even prepare the track itself for inspection and replacement of parts. U.S. Pat. No. 9,688,325 to Hakes is directed to one known undercarriage assembly for a mobile machine including track links having a body portion with projecting pin lugs, sprocket lugs, and roller lugs.

SUMMARY OF THE INVENTION

In one aspect, a track shoe includes a track shoe body having a first outboard edge, a second outboard edge, and a ground contact surface. The track shoe body further includes a first set of pin lugs adjacent to the first outboard edge, a second set of pin lugs adjacent to the second outboard edge, and a roller pad positioned between the first set of pin lugs and the second set of pin lugs. The roller pad includes a roller contact surface positioned opposite to the ground contact surface and extending in a fore-to-aft direction between a first roller pad end and a second roller pad end. The first roller pad end includes a relatively softer material, and the second roller pad end includes a relatively harder material that forms a trimming edge for trimming off interfering material of an adjacent track shoe in a machine track.

In another aspect, a machine track includes a plurality of track shoes and a plurality of track pins coupling together the plurality of track shoes. The plurality of track shoes each include a first set of pin lugs, a second set of pin lugs, and a roller pad. The roller pads each include a first roller pad end formed of a relatively softer material, and a second roller pad end formed of a relatively harder material that forms a trimming edge. The roller pads are positioned in serial alignment, such that the trimming edge of the second roller pad end of each one of the roller pads is positioned adjacent to the first roller pad end of an adjacent one of the roller pads.

In still another aspect, a track shoe includes a one-piece track shoe body having a first set of pin lugs, a second set of pin lugs, and a roller pad positioned between the first set of pin lugs and the second set of pin lugs. The roller pad includes a roller contact surface extending in a fore-to-aft direction between a first roller pad end and a second roller pad end. The first roller pad end includes a relatively softer material, and the second roller pad end includes a relatively harder material that forms a trimming edge for trimming off interfering material of an adjacent track shoe in a machine track.

DETAILED DESCRIPTION

Figure 1:
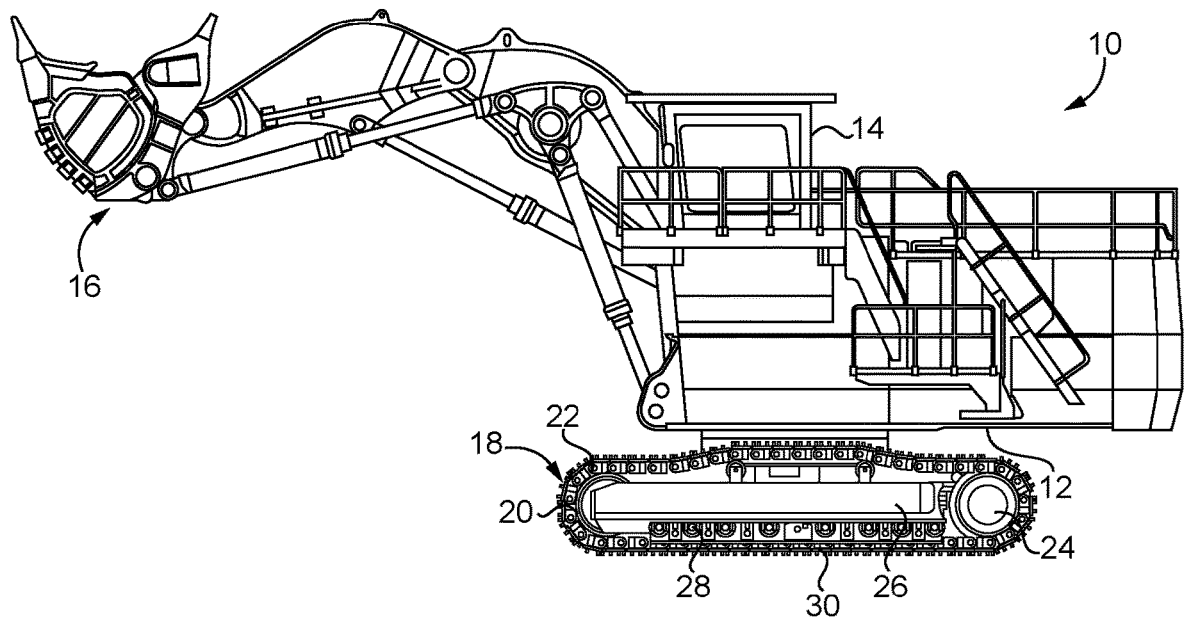
FIG. 1 is a diagrammatic view of a track-type machine, according to one embodiment.

Referring to FIG. 1, there is shown a machine 10 according to one embodiment. Machine 10 includes a track-type machine having a machine frame 12 with an operator cab 14 mounted thereon. An implement system 16 is also coupled with frame 12. Frame 12 may be supported on and rotatable relative to a ground-engaging track system 18 having a track 20 extending about a plurality of rotatable track-engaging elements. The rotatable track-engaging elements can include one or more idlers 22, a drive sprocket 24, and a plurality of track rollers 28, all mounted to a track roller frame 26. Machine 10 is shown in the context of a mining machine 10, namely, a hydraulic mining shovel or the like where implement system 16 includes a hydraulically actuated implement system structured to operate at least primarily at a working face of a mine. Machine 10 could alternatively be a rope shovel, such as an electric rope shovel, or a variety of other types of equipment such as a tractor or an excavator.

Those skilled in the art will appreciate that certain mining machines, such as the illustrated hydraulic mining shovel, may be operated much of the time at fixed locations in a worksite, such as at a working face to capture, lift, and dump material into mining trucks or the like. Such machines commonly tram, in other words travel across a worksite, a minority of the time, commonly having a travel ratio of only about 10%. Such machines can weigh up to three million pounds, potentially more and thus, despite the relative infrequency of tramming subject their tracks to extreme wear, loading, and material deformation, for instance. It is often desirable for tracks used with such machines to have a service life in the tens of thousands of hours. As will be further apparent from the following description, machine 10 and track system 18 in particular, is structured for a service life that is extended relative to other strategies, and has a reduced risk of premature failure or necessity for field service.

Figure 2:
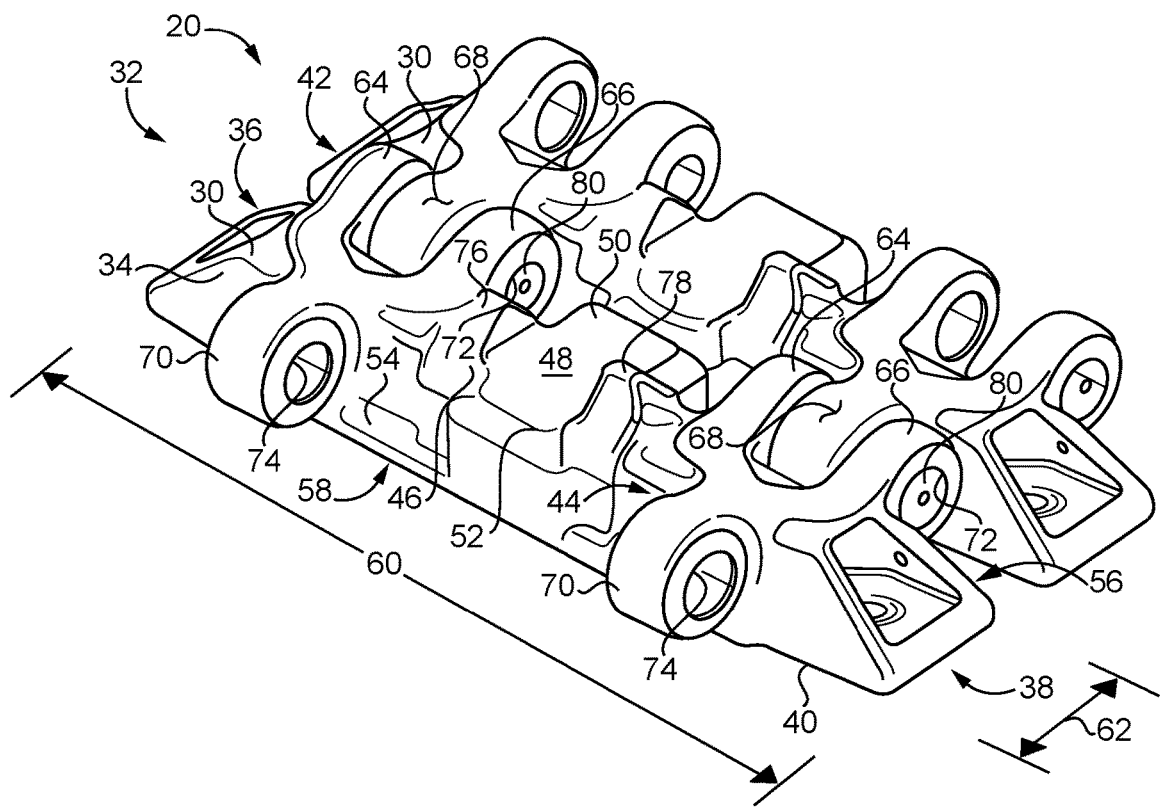
FIG. 2 is a diagrammatic view, in perspective, of a track joint assembly in a machine track, according to one embodiment.

Referring also now to FIG. 2, there is shown a section of machine track 20 including a track joint assembly 32. Track joint assembly 32 includes a plurality of track shoes 30, and a plurality of track pins 80 coupling together track shoes 30. In the illustrated embodiment, each of the plurality of track shoes 30 is substantially identical and therefore the following description of track shoe 30 in the singular should be understood to refer by way of analogy to any of the track shoes in track 20. Likewise, certain features of each track shoe 30 that are similar, analogous, or identical to one another, are discussed herein and illustrated in the drawings by way of like reference numerals.

Track shoe 30 includes a track shoe body 34 that may be one-piece and has a first outboard edge 36, a second outboard edge 38, and a ground contact surface 40. Track shoe 30 may further include a shoe plate 54 that includes each of first outboard edge 36 and second outboard edge 38, as well as ground contact surface 40. Shoe plate 54 is part of track shoe body 34 and also includes a forward edge 56 and a back edge 58 each extending between first outboard edge 36 and second outboard edge 38. In the illustrated embodiment shoe plate 54, and track shoe 30/shoe body 34, has a major diameter 60 extending between first outboard edge 36 and second outboard edge 38, and a minor diameter 62 extending between forward edge 56 and back edge 58. Ground contact surface 40 can be substantially planar and include a generally rectangular footprint. Track shoe 30/track shoe body 34 further includes a first set of pin lugs 42 adjacent to first outboard edge 36, and a second set of pin lugs 44 adjacent to second outboard edge 38. First set of pin lugs 42 and second set of pin lugs 44 may be integral with shoe plate 54. Further, track shoe body 34 may be one-piece, with first set of pin lugs 42, second set of pin lugs 44, and other features yet to be described formed by a one-piece casting or forging, of steel, iron, or other materials. References herein to track shoe 30 or shoe body 34 can generally be understood to refer by analogy to either.

Shoe body 34 further includes a roller pad 46 positioned between first set of pin lugs 42 and second set of pin lugs 44. Roller pad 46 includes a roller contact surface 48 positioned opposite to ground contact surface 40, and extending in a fore-to-aft direction between a first roller pad end 50 and a second roller pad end 52. First roller pad end 50 can be arranged substantially at the same location as, and can form part of, forward edge 56, whereas second roller pad end 52 can be positioned substantially at the same location as and form a part of back edge 58. As used herein the terms "forward" and "back" should be understood in a relative sense, in relation to each other, and are not limiting respecting an orientation of track shoe 30 in track 20. In some instances, machine 10 might be trammed in a "forward" direction approximately the same amount of time as it is operated in a "back" direction.

In a practical implementation, first set of pin lugs 42 and second set of pin lugs 44 may each be arranged in a Y-pattern, with the respective sets of pin lugs 42 and 44 extending both fore and aft of ground contact surface 40. It can be noted that first set of pin lugs 42 and second set of pin lugs 44 each extend in the fore-to-aft direction beyond forward edge 56 and beyond back edge 58, respectively, the significance of which will be further apparent from the following description. First set of pin lugs 42 and second set of pin lugs 44 may further each include two forward lugs 64 and 66 having a space 68 extending therebetween, and one back lug 70 at an inboard-outboard location that is coincident with an inboard-outboard location of the corresponding space 68. An inboard-outboard location can be understood in reference to an inboard-outboard direction, which means a direction that is, respectively, toward or away from first outboard edge 36 and away or toward, second outboard edge 38. An outboard direction would be understood as a direction toward one of first outboard edge 36 or second outboard edge 38 and away from a longitudinal fore-to-aft centerline defined by roller pad 46. An inboard direction is opposite to the outboard direction. Thus, back lug 70 is positioned to coincide with a space formed between two forward lugs in an adjacent track shoe 30. First set of pin lugs 42 and second set of pin lugs 44 each further include a forward pin bore 72 extending through the corresponding two forward lugs 64 and 66, and a back pin bore 74 extending through the corresponding one back lug 70. Track shoe 30 further includes a first drive lug 76 positioned inboard of first set of pin lugs 42 and outboard of roller pad 46, and a second drive lug 78 positioned inboard of second set of pin lugs 44 and outboard of roller pad 46. Drive lugs 76 and 78 are structured to engage with drive sprocket 24. It can further be noted from FIG. 2 that back lug 70 in each of first set of pin lugs 42 and second set of pin lugs 44 is positioned rearward of second roller pad end 50 in track shoe 30. Forward pin bore 72 in each of first set of pin lugs 42 and second set of pin lugs 44 is at a fore-to-aft location that is coincident with a fore-to-aft location of first roller pad end 50. Such a configuration allows, among other things, roller pads 46 in adjacent track shoes 30 to be positioned adjacent to one another, for supporting track rollers 28. Track shoes 30 are in serial alignment, and thus each in the same orientation within track 20.

Figure 3:
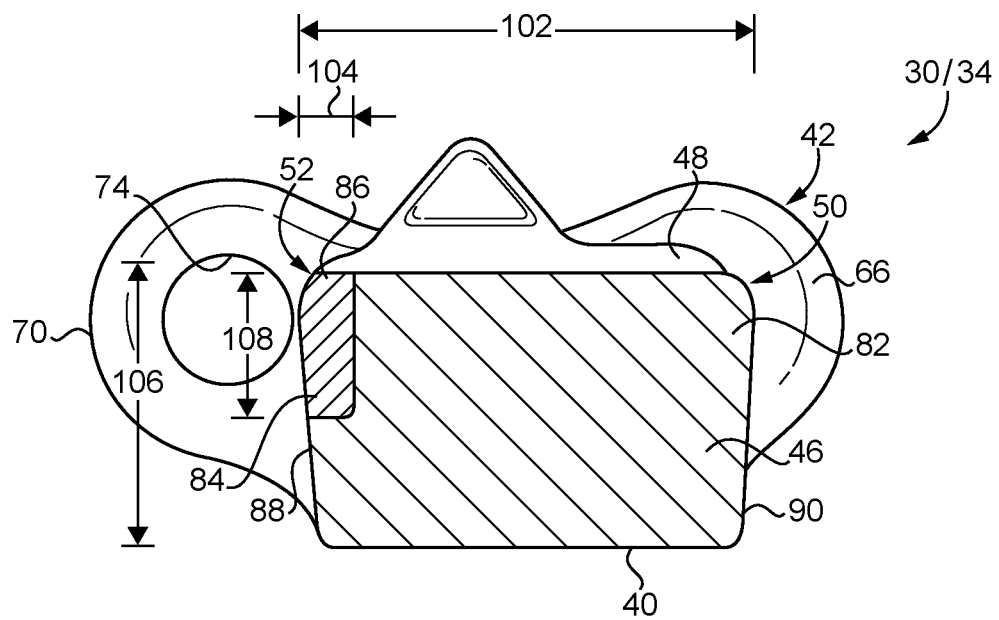
FIG. 3 is a sectioned view through a track shoe, according to one embodiment.

Referring also now to FIG. 3, it can be seen that second roller pad end 52 includes a substantially vertical end wall 88, and that first roller pad end 50 includes another substantially vertical end wall 90. End walls 88 and 90 may be angled just slightly inwardly in one embodiment, in a direction of ground contact surface 40. First roller pad end 50 includes a relatively softer material 82, and may be formed of the relatively softer material 82, whereas second roller pad end 52 includes a relatively harder material 84, and may be formed of the relatively harder material 84. Relatively softer material 82 and relatively harder material 84 can be iron or an iron material such as steel, that is differentially hardened to different material hardnesses. Relatively softer material 82 may have a material hardness of about 45 HRC (Rockwell Hardness C) or less, and relatively harder material 84 may have a material hardness greater than 45 HRC. As used herein "about" can be understood in the context of conventional rounding to a consistent number of significant digits. Accordingly "about 45" means from 44.5 to 45.4, and so on. Induction hardening of part or all of second roller pad end 52 can enable the different material hardnesses. In a further embodiment, relatively harder material 84 may have a material hardness of about 50 HRC, or greater. Relatively softer material 82 may have a material hardness down to about 40 HRC, although the present discourse is not thereby limited. Other techniques for selective hardening are contemplated within the scope of the present disclosure, such as selective heat treating of certain parts of roller pad 46. Also depicted in FIG. 3 are certain dimensional and proportional attributes of track shoe 30 and track shoe body 34. Roller contact surface 48 has a first running length 102 between and inclusive of first roller pad end 50 and second roller pad end 52. Roller pad 46 further has a first thickness 106 from roller contact surface 48, and between roller contact surface 48 and ground contact surface 40. Relatively harder material 84 within second roller pad end 52 forms a trimming edge 86 for trimming off interfering material of an adjacent track shoe 30 in machine track 20, as further discussed herein. In a practical implementation strategy trimming edge 86 has a second running length 104 that is less than 50% of first running length 102. Second running length 104 may be less than 25% of first running length 102, and in still further instances might be about 10% or less of first running length 102. Trimming edge 86 further has a second thickness 108 from roller contact surface 48, and between roller contact surface 48 and ground contact surface 40, that is less than first thickness 106. Second thickness 108 might be less than 75% of first thickness 106, and in some instances less than 60%, or potentially less than 50%, of first thickness 106

INDUSTRIAL APPLICABILITY

Figure 4:
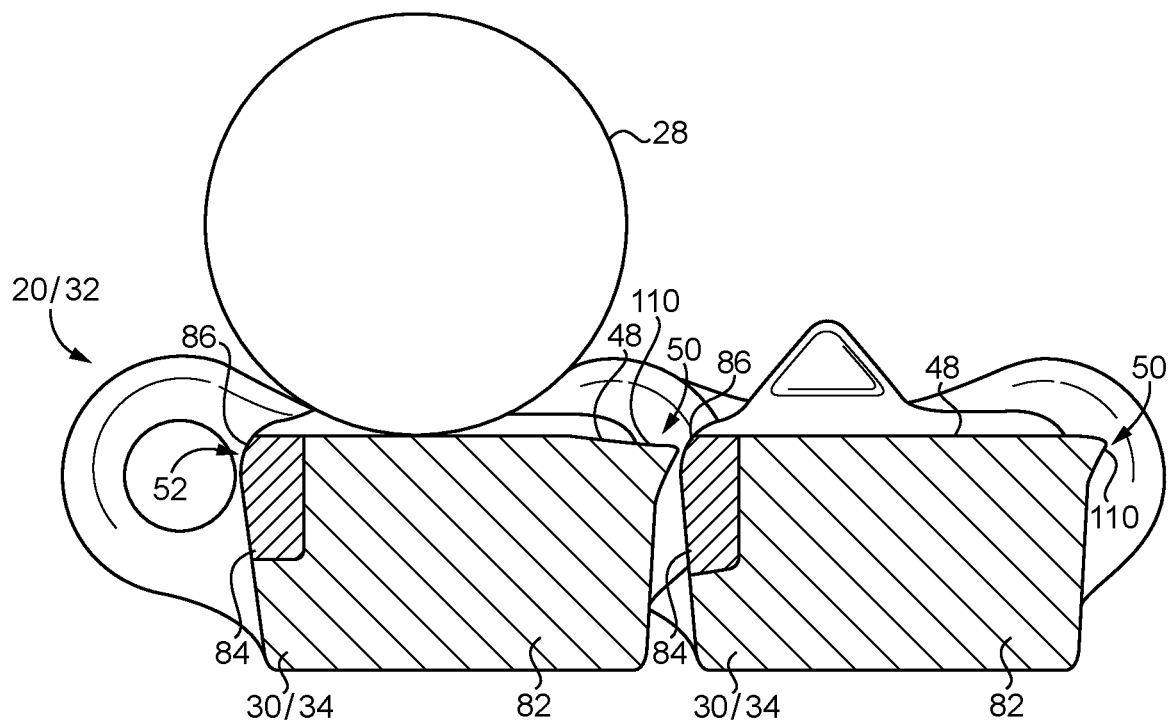
FIG. 4 is a sectioned view through a track joint assembly in a machine track, in one configuration.
Figure 5:
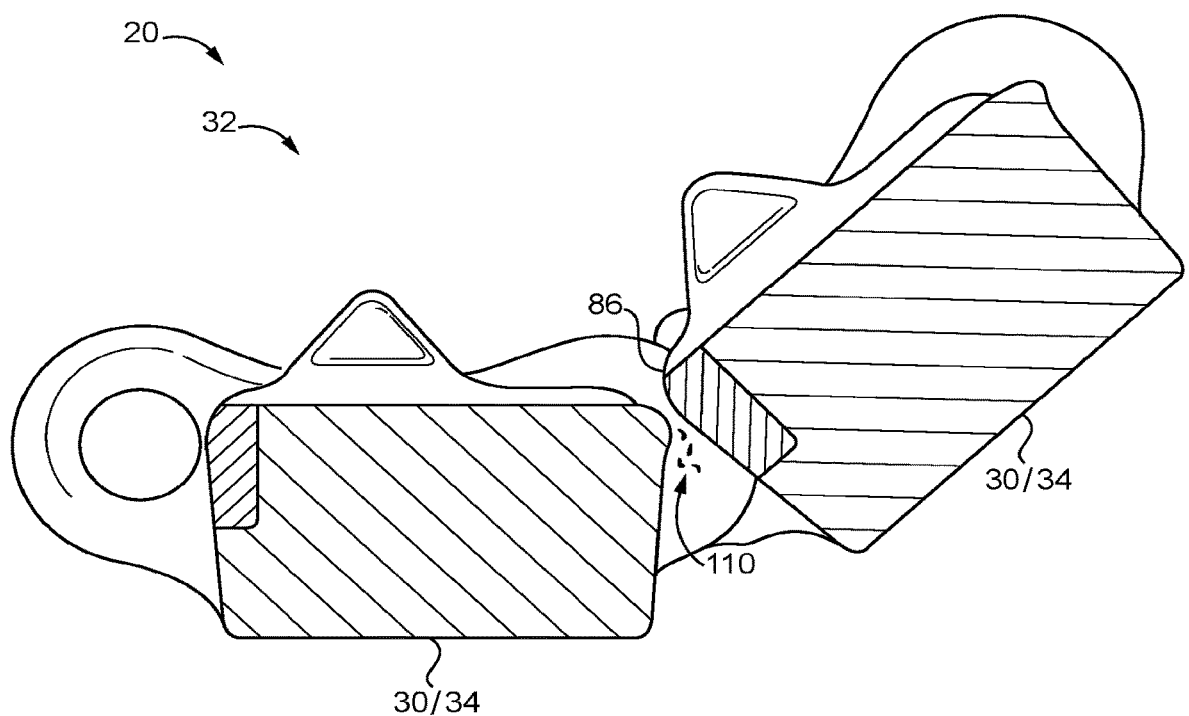
FIG. 5 is a sectioned view through a track joint assembly in a machine track, in another configuration.

Referring to the drawings generally, but in particular now to FIGS. 4 and 5, there are shown track 20 and track joint assembly 32 in, respectively, a first configuration with two track shoes 30 as they might appear in contact with a track roller 28 upon a substrate and in a second configuration as the two track shoes 30 might appear advancing around drive sprocket 24 or idler 22. In FIG. 4 track roller 28 is depicted as it might appear contacting roller contact surface 48 and rolling relative to roller contact surface 48. Track shoes 30 are also shown as they might appear having been subjected to prior passes of roller 28, with roller 28 having rolled along roller contact surfaces 48 and transmitted a weight load of machine 10 to roller surfaces 48 to a sufficient extent and for a sufficient number of times to plastically deform relatively softer material 82 to form a toenail 110 of material 82. Toenail 110 is deformed across a gap between the adjacent track shoes 30 such that toenail 110 nearly touches trimming edge 86 of the track shoe 30 shown on the right.

It will be understood that track 20 can move in forward directions and in reverse directions relative to track roller 28 as machine 10 is trammed to different working locations at a worksite. Where track roller 28 rolls relative to track 20 in a direction to the left in FIG. 4 relatively harder material 84 will be resistant to plastic deformation. Where track roller 28 rolls relative to track 20 to the right in FIG. 4 the machine weight will tend to cause relatively softer material 82 to be squeezed and plastically deformed to produce toenail 110. It has been observed in earlier track systems that so-called toenailing can eventually result in plastically deformed material of one track shoe interfering with an adjacent track shoe, often to the point that contact between the adjacent roller pads and breaking off of the toenail occurs.

It can be seen from FIG. 5 that as the track shoes 30 are rotated relative to one another trimming edge 86 of the track shoe 30 shown on the right can engage against and trim off material forming toenail 110. In earlier strategies noted above toenails could be broken off, often in relatively large pieces and creating locations that could cause crack propagation deep enough into the track links to risk failure. According to the present disclosure, the relatively hard material 84 forming trimming edge 86 can be expected to cut off, grind or otherwise trim away relatively small bits of the relatively softer material of the adjacent track shoe instead of breaking off fragments that can risk crack propagation or other problems. It will thus be appreciated that as track 20 experiences field service, trimming edge 86 can gradually trim off small pieces, even tiny granules, of the relatively softer material 82 and reduce the risk of field service failures. Certain other earlier strategies attempted to harden an entirety of a roller contact surface of a track shoe, or required cutting toenails off manually with a cutting torch. While such approaches can likely avoid track failure or reduce the overall rate of wear, the track shoes did not tend to have a biased wear pattern that more directly and elegantly addresses the root cause of the toenailing phenomenon described herein.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A track shoe comprising:
   a track shoe body including a first outboard edge, a second outboard edge, and a ground contact surface;
   the track shoe body further including a first set of pin lugs adjacent to the first outboard edge, a second set of pin lugs adjacent to the second outboard edge, and a roller pad positioned between the first set of pin lugs and the second set of pin lugs;
   the roller pad including a roller contact surface positioned opposite to the ground contact surface and extending in a fore-to-aft direction between a first roller pad end and a second roller pad end; and
   the first roller pad end including, within the roller contact surface, a relatively softer material, and the second roller pad end including, within the roller contact surface, a relatively harder material that forms a trimming edge for trimming off interfering material of an adjacent track shoe in a machine track.

2. The track shoe of claim 1 wherein the roller contact surface has a first running length between the first roller pad end and the second roller pad end, and the trimming edge has a second running length that is less than 50% of the first running length.

3. The track shoe of claim 2 wherein the second running length is less than 25% of the first running length.

4. The track shoe of claim 2 wherein the roller pad has a first thickness between the roller contact surface and the ground contact surface, and the trimming edge has a second thickness between the roller contact surface and the ground contact surface that is less than the first thickness.

5. The track shoe of claim 4 wherein the relatively softer material has a material hardness of about 45 HRC or less, and the relatively harder material has a material hardness greater than 45 HRC.

6. The track shoe of claim 1 wherein the track shoe body further includes a shoe plate that includes each of the first outboard edge, the second outboard edge, and the ground contact surface, and each of the first set of pin lugs and the second set of pin lugs is integral with the shoe plate.

7. The track shoe of claim 6 wherein the shoe plate further includes a forward edge and a back edge each extending between the first outboard edge and the second outboard edge, and the shoe plate having a major diameter extending between the first outboard edge and the second outboard edge, and a minor diameter extending between the forward edge and the back edge.

8. The track shoe of claim 7 wherein the first set of pin lugs and the second set of pin lugs each include:
two forward lugs having a space extending therebetween, and one back lug at an inboard-outboard location that is coincident with an inboard-outboard location of the corresponding space; and
a forward pin bore extending through the corresponding two forward lugs, and a back pin bore extending through the corresponding one back lug.

9. The track shoe of claim 8 wherein the forward pin bore in each of the first set of pin lugs and the second set of pin lugs is at a fore-to-aft location that is coincident with a fore-to-aft location of the first roller pad end, and the back pin bore in each of the first set of pin lugs and the second set of pin lugs is at a fore-to-aft location that is rearward of a fore-to-aft location of the second roller pad end.

10. A machine track comprising:
a plurality of track shoes;
a plurality of track pins coupling together the plurality of track shoes;
the plurality of track shoes each including a first set of pin lugs, a second set of pin lugs, and a roller pad;
the roller pads each including a first roller pad end formed of a relatively softer material, and a second roller pad end formed of a relatively harder material that forms a trimming edge; and
the roller pads being positioned in serial alignment in a fore-to-aft direction, such that the relatively harder material of the trimming edge of the second roller pad end of each one of the roller pads is positioned facing and adjacent in the fore-to-aft direction to the relatively softer material of the first roller pad end of an adjacent one of the roller pads.

11. The machine track of claim 10 wherein:
the first set of pin lugs and the second set of pin lugs in each of the plurality of track shoes includes a forward lug having a forward pin bore formed therein, and a back lug having a rearward pin bore formed therein; and
the forward pin bore is at a fore-to-aft location that is coincident with a fore-to-aft location of the first roller pad end in the corresponding track shoe.

12. The machine track of claim 11 wherein the back lug in each of the first set of pin lugs and the second set of pin lugs is positioned rearward of the second roller pad end in the corresponding track shoe.

13. The machine track of claim 12 wherein each of the plurality of track shoes further includes a first drive lug positioned inboard of the first set of pin lugs and outboard of the roller pad, and a second drive lug positioned inboard of the second set of pin lugs and outboard of the roller pad.

14. The machine track of claim 13 wherein:
the roller contact surface has a first running length between the first pad end and the second pad end, and the trimming edge has a second running length that is less than a majority of the first running length; and
the roller pad has a first thickness, and the trimming edge has a second thickness that is less than the first thickness.

15. The machine track of claim 14 wherein the relatively softer material has a material hardness of about 45 HRC or less, and the relatively harder material has a material hardness greater than 45 HRC.

16. A track shoe comprising:
a one-piece track shoe body including a first set of pin lugs, a second set of pin lugs, and a roller pad positioned between the first set of pin lugs and the second set of pin lugs;
the roller pad including a ground contact surface, a roller contact surface extending in a fore-to-aft direction between a first roller pad end and a second roller pad end;
the first roller pad end including a relatively softer material;
the second roller pad end including a relatively harder material that forms a trimming edge for trimming off interfering material of an adjacent track shoe in a machine track; and
the trimming edge having a running length of the relatively harder material extending in the fore-to-aft direction, and a thickness of the relatively harder material extending in a vertical direction between the roller contact surface and the ground contact surface that is greater than the running length.

17. The track shoe of claim 16 wherein
the second roller pad end includes a substantially vertical end wall transitioning with the trimming edge and formed in part by the relatively harder material.

18. The track shoe of claim 17 wherein the relatively softer material is pervasive within the one-piece track shoe body outside of the trimming edge.

19. The track shoe of claim 17 wherein the one-piece track shoe body includes a ground contact surface and each of the first set of pin lugs and the second set of pin lugs is arranged in a Y-pattern and extends both fore and aft of the ground contact surface.

20. The track shoe of claim 16 wherein the relatively softer material has a material hardness of about 45 HRC or less, and the relatively harder material has a material hardness greater than 45 HRC.

* * * * *